(12) United States Patent
Mikawa (10) Patent No.: US 11,330,140 B2
(45) Date of Patent: May 10, 2022

(54) IMAGE PROCESSING APPARATUS AND IMAGE PROCESSING METHOD

(71) Applicant: CANON KABUSHIKI KAISHA, Tokyo (JP)

(72) Inventor: Takuma Mikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 16/519,201

(22) Filed: Jul. 23, 2019

(65) Prior Publication Data
US 2020/0036856 A1    Jan. 30, 2020

(30) Foreign Application Priority Data
Jul. 30, 2018    (JP) .............................. JP2018-142561

(51) Int. Cl.
*H04N 1/21*    (2006.01)
*H04N 5/77*    (2006.01)

(52) U.S. Cl.
CPC ......... *H04N 1/2129* (2013.01); *H04N 1/2125* (2013.01); *H04N 5/772* (2013.01)

(58) Field of Classification Search
CPC ..... H04N 1/21–2195; H04N 1/41–419; H04N 5/144–145; G06T 7/20–292; G06T 3/4015
USPC ................... 345/173–178; 382/107; 396/153
See application file for complete search history.

(56) References Cited

U.S. PATENT DOCUMENTS

| 10,033,931 | B2 | 7/2018 | Takeda |
| 10,291,899 | B2 | 5/2019 | Mikawa et al. |
| 2013/0088618 | A1* | 4/2013 | Kunishige .......... H04N 5/23245 348/239 |
| 2015/0271355 | A1* | 9/2015 | Matsumoto ............ H04N 1/215 348/231.2 |
| 2016/0119576 | A1 | 4/2016 | Takeda |
| 2017/0052690 | A1 | 2/2017 | Mikawa |

FOREIGN PATENT DOCUMENTS

JP    2016-082546 A    5/2016

* cited by examiner

*Primary Examiner* — Xi Wang
(74) *Attorney, Agent, or Firm* — Venable LLP (57) ABSTRACT

An image processing apparatus, comprises a recording control unit configured to perform control to, when extracting a frame from a RAW file in which RAW data of a plurality of frames is recorded and recording the extracted frame as a RAW still image file, record RAW data of the extracted frame and information indicating that predetermined image processing has been applied to the RAW data into the RAW still image file.

14 Claims, 7 Drawing Sheets

IMAGE PROCESSING APPARATUS AND IMAGE PROCESSING METHOD

BACKGROUND OF THE INVENTION

Field of the Invention

The present invention relates to an image processing apparatus and an image processing method that handle RAW data, and a program.

Description of the Related Art

Raw data obtained by an image sensor (RAW data) is used as RAW still images and RAW moving images; in some cases, RAW moving images are stored as a RAW moving image file in a state where a part of image processing has been applied thereto in consideration of handleability of data, a processing speed, and the like. As a data amount of RAW data is significantly large, a method of generating proxy data different from RAW data and using the proxy data during a normal operation has been suggested as described in Japanese Patent Laid-Open No. 2016-082546.

Japanese Patent Laid-Open No. 2016-082546 describes a technique in which RAW moving images and proxy moving images (normal compressed moving images) are simultaneously recorded, and when an operation of extracting a still image is performed while checking the content of the proxy moving images during the reproduction of the proxy moving images, the still image is stored by developing a corresponding frame of the RAW moving images.

In Japanese Patent Laid-Open No. 2016-082546, one designated frame of RAW moving images is developed, and the result of the development is stored as a JPEG file. Meanwhile, a method of extracting one designated frame of RAW moving images as RAW data without developing the same and storing the RAW data as a RAW still image is also plausible.

However, when handling RAW data to which a part of image processing has been applied, the properties of RAW data differ between a RAW still image obtained by extracting one frame of RAW moving images and a normal RAW still image to which image processing has not been applied. Therefore, if similar development processing is executed with respect to these RAW still images, there may be a case where processing that has been executed with respect to the RAW moving images (e.g., white balance) is redundantly performed with respect to the RAW still image extracted from the RAW moving images.

SUMMARY OF THE INVENTION

The present invention has been made in consideration of the aforementioned problems, and realizes techniques with which appropriate development processing can be performed in accordance with differences in the properties of RAW still images.

In order to solve the aforementioned problems, the present invention provides an image processing apparatus, comprising: a recording control unit configured to perform control to, when extracting a frame from a RAW file in which RAW data of a plurality of frames is recorded and recording the extracted frame as a RAW still image file, record RAW data of the extracted frame and information indicating that predetermined image processing has been applied to the RAW data into the RAW still image file.

In order to solve the aforementioned problems, the present invention provides an image processing apparatus, comprising: a shooting control unit configured to generate a RAW file in which RAW data of a plurality of frames acquired through shooting performed by an image capturing unit is recorded, wherein when the RAW data is to be recorded as a RAW moving image file, the shooting control unit performs control to record the RAW data with predetermined image processing applied thereto, and when a frame is to be extracted from the RAW file and recorded as a RAW still image file, the shooting control unit performs control to record the extracted frame without applying the predetermined image processing to the RAW data.

In order to solve the aforementioned problems, the present invention provides an image processing method, comprising: extracting a frame from a RAW file in which RAW data of a plurality of frames is recorded and recording the extracted frame as a RAW still image file, wherein in the recording, control is performed to record RAW data of the extracted frame and information indicating that predetermined image processing has been applied to the RAW data into the RAW still image file.

In order to solve the aforementioned problems, the present invention provides an image processing method, comprising: generating a RAW file in which RAW data of a plurality of frames acquired through shooting performed by an image capturing unit is recorded, wherein in the generating, when the RAW data is to be recorded as a RAW moving image file, control is performed to record the RAW data with predetermined image processing applied thereto, and when a frame is to be extracted from the RAW file and recorded as a RAW still image file, control is performed to record the extracted frame without applying the predetermined image processing to the RAW data.

In order to solve the aforementioned problems, the present invention provides a non-transitory computer-readable storage medium storing a program for causing a computer to execute an image processing method, comprising: extracting a frame from a RAW file in which RAW data of a plurality of frames is recorded and recording the extracted frame as a RAW still image file, wherein in the recording, control is performed to record RAW data of the extracted frame and information indicating that predetermined image processing has been applied to the RAW data into the RAW still image file.

In order to solve the aforementioned problems, the present invention provides a non-transitory computer-readable storage medium storing a program for causing a computer to execute an image processing method, comprising: generating a RAW file in which RAW data of a plurality of frames acquired through shooting performed by an image capturing unit is recorded, wherein in the generating, when the RAW data is to be recorded as a RAW moving image file, control is performed to record the RAW data with predetermined image processing applied thereto, and when a frame is to be extracted from the RAW file and recorded as a RAW still image file, control is performed to record the extracted frame without applying the predetermined image processing to the RAW data.

According to the present invention, appropriate development processing can be performed in accordance with differences in the properties of RAW still images.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

<Apparatus Configuration>

First, a configuration of an image processing apparatus 100 of the present embodiment will be described with reference to FIG. 1.

Figure 1:
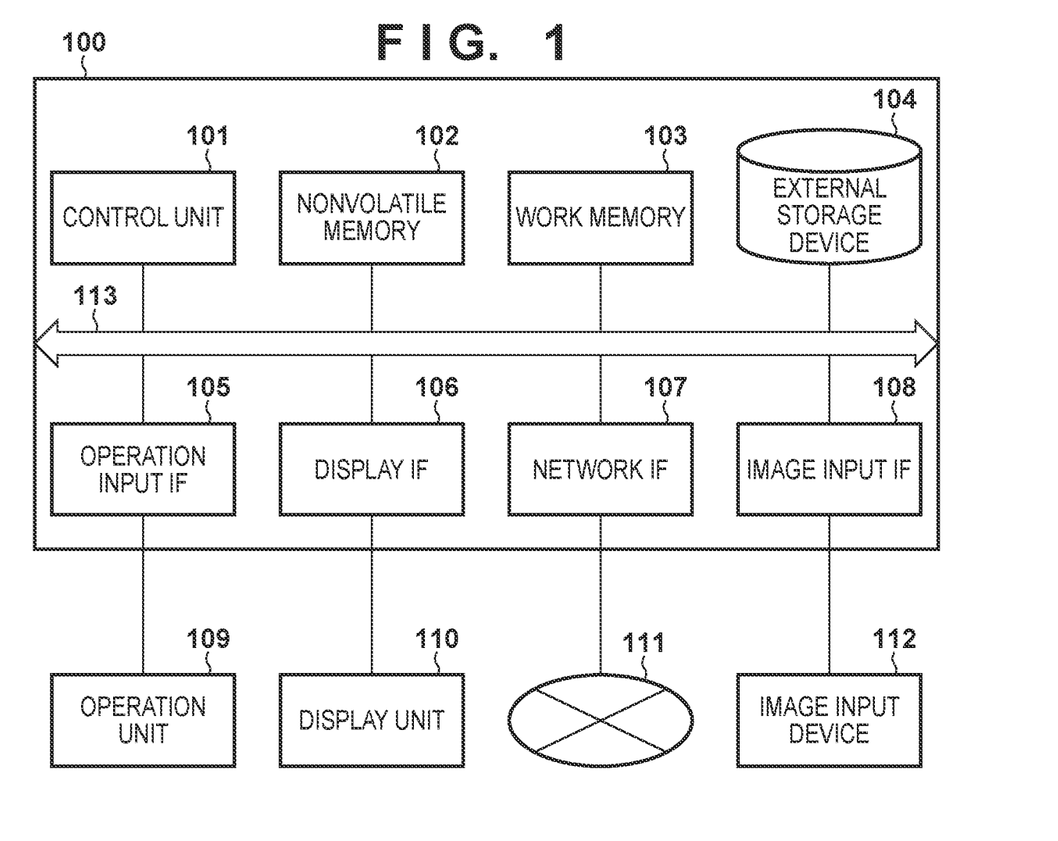
FIG. 1 is a block diagram showing an apparatus configuration of the present embodiment.

In FIG. 1, a control unit 101 is a CPU (Central Processing Unit) that controls an entirety of the image processing apparatus 100. A nonvolatile memory 102 is a ROM (Read Only Memory) that stores various types of control programs executed by the CPU of the control unit 101, and parameters. A work memory 103 is a RAM (Random Access Memory) that temporarily stores programs and data that are necessary for various types of processing executed by the CPU of the control unit 101. An external storage device 104 includes, for example, a hard disk or a memory card built into the image processing apparatus 100, or a hard disk, a memory card, a USB flash memory, a DVD, or a Blu-ray disc that can be loaded into and removed from the image processing apparatus 100. The external storage device 104 stores, for example, an OS (Operating System) executed by the CPU of the control unit 101 and an image processing application program, which will be described later. An operation input IF 105 is an interface that accepts user operations via an operation unit 109. The operation unit 109 is an input device, such as a pointing device, a keyboard, and a touchscreen for inputting data. A display IF 106 is an interface that displays, on a display unit 110, data held in the image processing apparatus 100 and data supplied from an external apparatus. A network IF 107 is an interface that connects to a network line 111, such as the Internet. An image input IF 108 is an interface via which an image input device 112, such as a digital camera, inputs image data including RAW moving images to be processed in the present embodiment. The display unit 110 is a display device, such as a liquid crystal device and an organic EL device. The above-described components 101 to 108 are communicably connected by a system bus 113.

In the present embodiment, the operations executed by the image processing apparatus 100 are realized as the control unit 101 controls various types of modules by reading out the OS and application programs from the external storage device 104 and activating the OS and application programs. However, the present embodiment is not limited to this, and the application programs may be supplied from, for example, an external apparatus that is connected by the network IF 107 via the network line 111.

The image processing apparatus 100 of the present embodiment is a communication apparatus (e.g., a mobile telephone and a smartphone, which is one type of mobile telephone), an information processing apparatus (e.g., a desktop PC and a tablet PC), or an image capturing apparatus (e.g., a digital video camera). Application software of the present embodiment is an application that performs image processing with respect to moving image data (hereinafter, an image processing application), and has a recording control function of extracting a designated frame from RAW moving images composed of RAW data and recording the extracted frame as a RAW still image, an image processing function of applying development processing to RAW moving images and RAW still images, and a display control function of displaying RAW moving images and RAW still images to which the development processing has been applied.

In a case where the image processing apparatus 100 is an image capturing apparatus, the configuration of FIG. 1 further includes an image capturing unit. The control unit 101 performs shooting control in which RAW data shot by the image capturing unit is recorded as a RAW still image file or a RAW moving image file. At the time of still image RAW shooting, RAW still image data shot by the image capturing unit is recorded into the external storage device 104 as a RAW still image file without applying thereto predetermined image processing, such as white balance (WB) and noise reduction (NR). While a RAW still image file obtained through normal shooting is a file that contains one piece of RAW data, RAW still images obtained through continuous shooting form a RAW still image file that contains a plurality of pieces of RAW data. At the time of moving image RAW shooting, the predetermined image processing (WB, NR) is applied to RAW moving image data of a plurality of frames shot by the image capturing unit, and the resultant RAW moving image data is recorded into the external storage device 104 as a RAW moving image file.

The application software of the present embodiment acquires a RAW moving image file and a RAW still image file that were shot in the above-described manner from the external storage device 104 or the image input device 112, and performs image processing.

The following describes an example in which the color depth of RAW moving images to be processed is 12 bits, the color depth of RAW still images is 14 bits, and RAW moving images are uncompressed RAW data to which both of the WB processing and the NR processing have been applied. Note that RAW moving images to be processed in the present embodiment are not limited to the foregoing; processing other than WB and NR (e.g., at least one of gamut settings, brightness correction, optical correction, sharpness, etc.) may be applied to the RAW moving images in some cases, and the RAW moving images may be compressed RAW data. It will be assumed that normal RAW still images that are not RAW still images extracted from RAW moving images as in the present embodiment are RAW data to which the processing of WB and NR has not been applied.

<Image Processing Application>

Next, a description is given of a processing procedure of the image processing application executed on the image processing apparatus 100 of the present embodiment.

Figure 2:
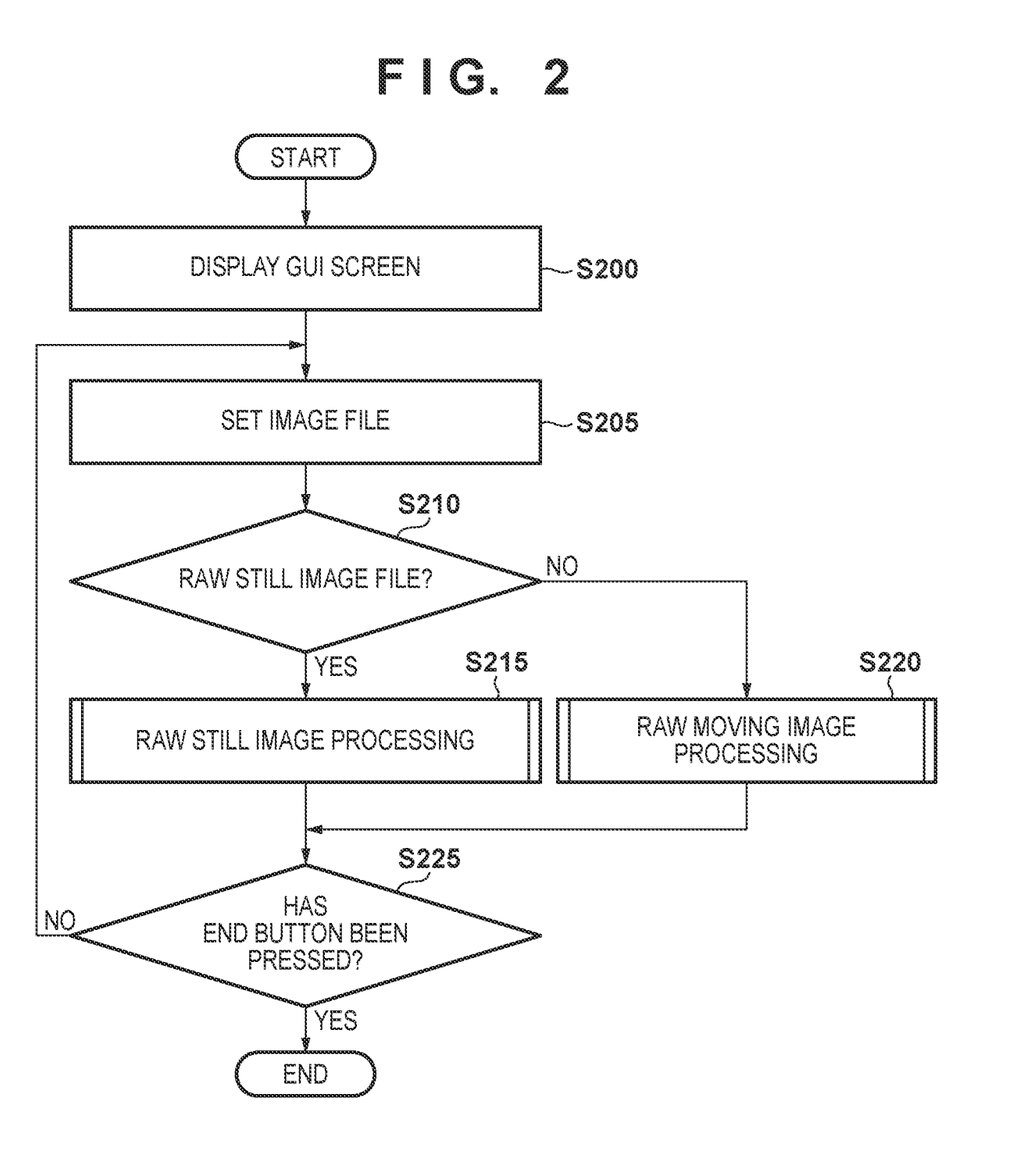
FIG. 2 is a flowchart showing a procedure of image processing of the present embodiment.

FIG. 2 is a flowchart showing the processing procedure of the image processing application of the present embodiment. Note that the processing of FIG. 2 is started upon activation of the image processing application. The image processing application is realized as the control unit 101 deploys a program of the image processing application stored in the external storage device 104 to the work memory 103 and executes the program.

Figure 3:
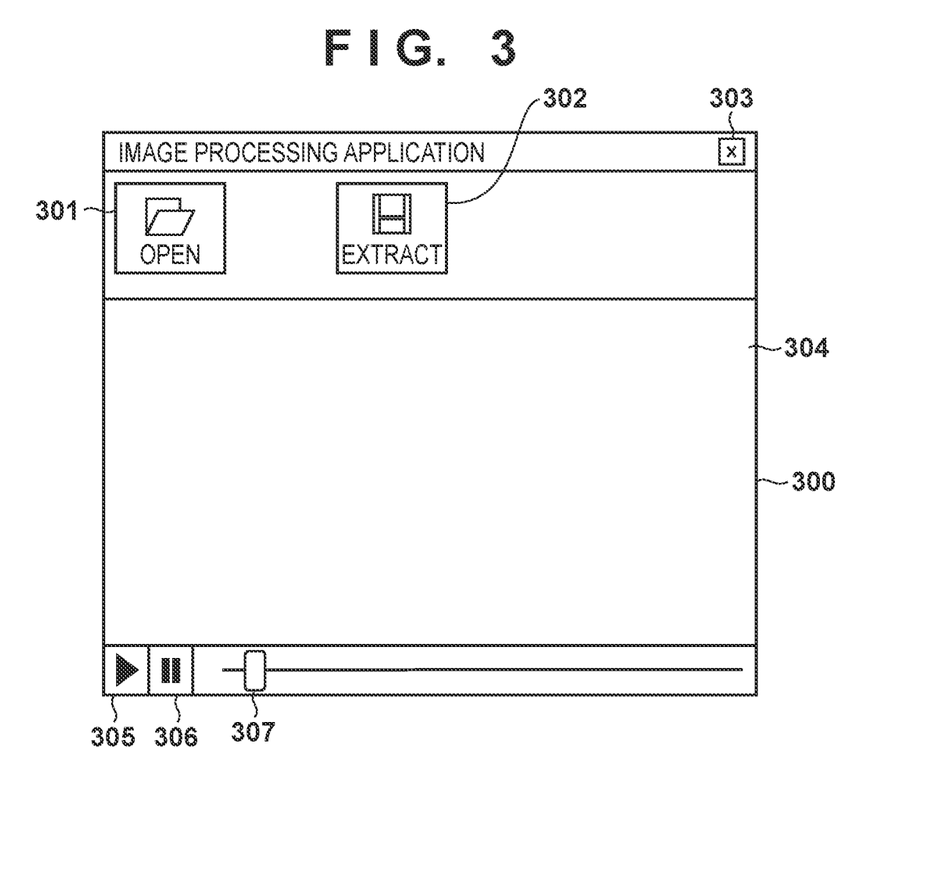
FIG. 3 shows an example of a GUI screen of an image processing program of the present embodiment.

In step S200, the control unit 101 displays, on the display unit 110, a GUI screen 300 of an image processing program shown in FIG. 3. FIG. 3 shows an example of the GUI screen 300 of the image processing program. In FIG. 3, an open button 301 is an operation member that is used to display a list of image files. An extraction button 302 is an operation member that is used to execute extraction processing, which will be described later. An end button 303 is an operation member that is used to end the image processing application. In a preview area 304, moving images and still images to be processed by the image processing application are displayed as a preview. A reproduction button 305 is an operation member that is used to reproduce moving images. A pause button 306 is an operation member that is used to pause the reproduction of moving images. A reproduction slider 307 is an operation member that is used to designate a reproduction position (frame position) of moving images. Note that each of the buttons 302, 305, 306 and the slider 307 is an operation member that is usable in handling RAW moving images. A user can operate the image processing application using the operation members of the GUI screen 300.

In step S205, the control unit 101 sets an image file. The control unit 101 displays a file selection dialogue (not illustrated) on the display unit 110. As a result, the user can select an image file stored in the external storage device 104. The file selection dialogue is configured to use, for example, a file open dialogue that is prepared in the OS as a standard, and is configured to be capable of selecting one image file. In the present embodiment, it will be assumed that one of a RAW still image file and a RAW moving image file is selectable as the image file.

In step S210, the control unit 101 determines whether the image file selected in step S205 is a RAW still image file; the processing proceeds to step S215 if it is determined that the selected image file is a RAW still image file, and proceeds to step S220 if it is determined that the selected image file is a RAW moving image file.

In step S215, the control unit 101 performs RAW still image processing. The detailed explanations of step S215 will be described later.

In step S220, the control unit 101 performs RAW moving image processing. The detailed explanations of step S220 will be described later.

If the open button 301 or the end button 303 of FIG. 3 is pressed in step S215 or S220, a transition is made to processing of step S225. In step S225, the control unit 101 determines whether the button pressed in step S215 or S220 is the end button 303. If the control unit 101 determines that the end button 303 was pressed, the processing ends, and if a button other than the end button 303 was pressed, it is determined that the open button 303 was pressed, and the processing returns to step S205.

<RAW Still Image Processing>

Below, the detailed explanations of the RAW still image processing in step S215 of FIG. 2 will be described using FIG. 4.

In step S400, the control unit 101 reads in the RAW still image file selected in step S205. Data that has been read in from the RAW still image file is held in the work memory 103 as RAW still image data.

In step S402, the control unit 101 determines whether the RAW still image file selected in step S205 contains images obtained through continuous shooting (continuous shooting images), and if it is determined that the RAW still image file contains continuous shooting images, the processing proceeds to step S403. Note that in the present embodiment, in the case of continuous shooting images, one file contains a plurality of pieces of RAW still image data: thus, whether the RAW still image file contains continuous shooting images is determined based on whether one file contains a plurality of pieces of RAW image data. If whether the RAW still image file contains continuous shooting images can be determined using other methods, any method can be used to make this determination. For example, whether the RAW still image file contains continuous shooting images may be determined based on information of a shooting mode inside the file or the like.

In step S403, the control unit 101 performs still image development processing with respect to the RAW still image file selected in step S205. Here, in order to handle the continuous shooting images, the development processing is performed for the number of the continuous shooting images. This RAW development processing is processing that includes both of the WB processing and the NR processing. Note that although detailed descriptions of the RAW development processing will be omitted as the RAW development processing is known, the RAW development processing includes processing of, for example, white balance (WB), noise removal (NR), demosaicing, chromatic aberration correction, color space conversion, color/luminance correction, sharpness, and the like. Also note that in the RAW development processing, the user may be able to set RAW development parameters.

Whether the RAW still image file contains continuous shooting images is determined in step S402 because, in the case of continuous shooting images, it is clearly identical that the file is not a RAW still image file extracted from RAW moving images, and there is no need to determine the content of image processing from image processing information.

In step S405, the control unit 101 performs processing for acquiring image processing information from the RAW still image file. In the present embodiment, the image processing information is recorded in header information of the RAW still image file in association with the RAW still image file.

The image processing information of the present embodiment includes two pieces of processing information related to white balance processing information and noise removal processing information. Furthermore, each piece of processing information includes two pieces of information of a processing ID and a processed flag.

<Image Processing Information>

White balance processing information: processing ID, processed flag

Noise removal processing information: processing ID, processed flag

The processing ID is information indicating a type of image processing, and in the present embodiment, it will be assumed as follows: 00=white balance processing, 01=noise removal processing.

The processed flag is information indicating whether image processing has been executed, and in the embodiment, it will be assumed as follows: 00=unprocessed, 01=processed.

For example, when both of image processing related to white balance and image processing related to noise removal have been executed, the image processing information holds the following information.

<Image Processing Information>
Processing ID=00, processed flag=01
Processing ID=01, processed flag=01

Figure 4:
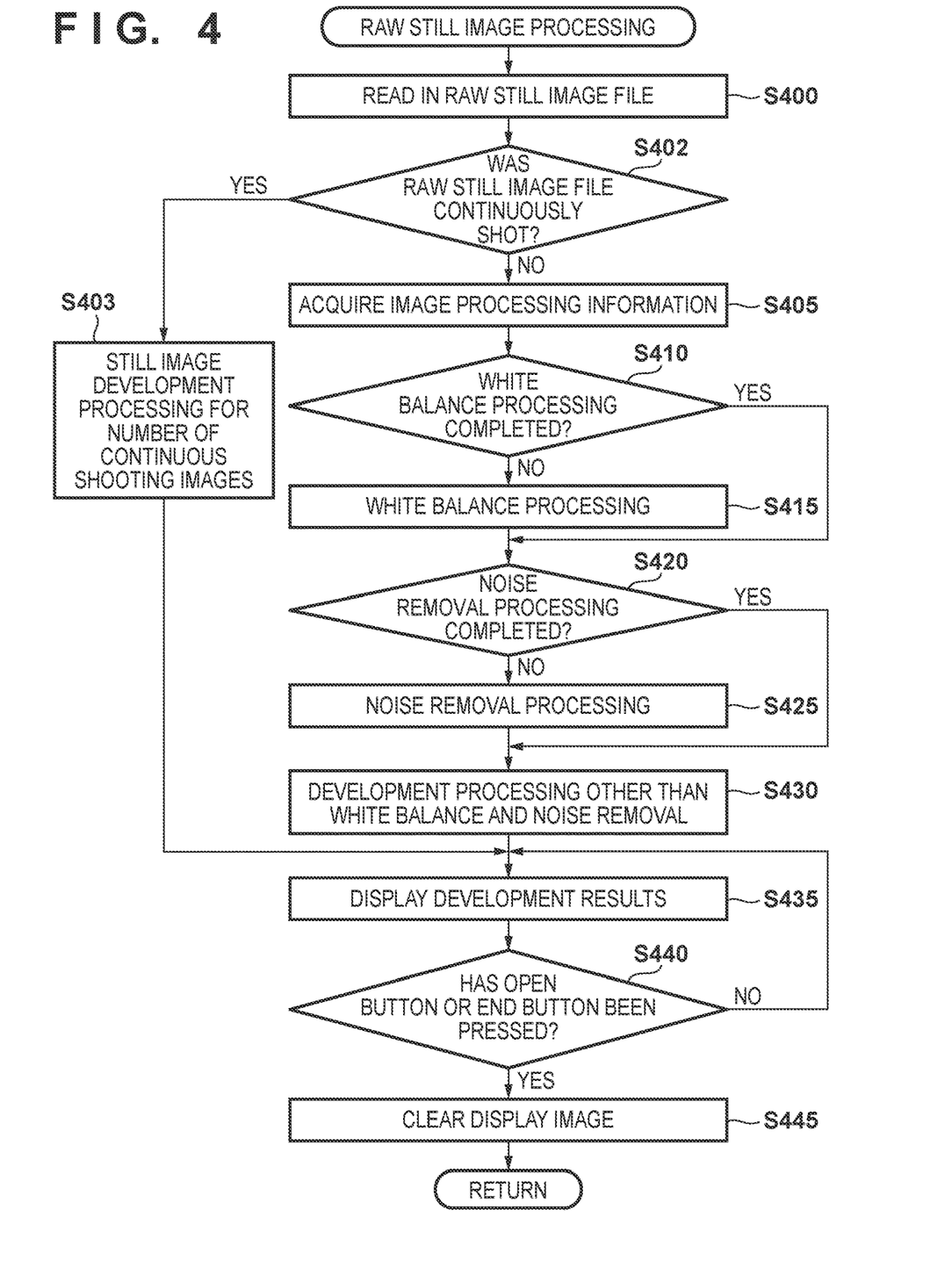
FIG. 4 is a flowchart showing RAW still image processing of FIG. 2.

These pieces of image processing information are added as the header information of the RAW still image file, and the control unit 101 acquires these pieces of image processing information in step S405 of FIG. 4. Note that when the image processing information is not added to the RAW still image file, that is, when step S405 failed to acquire the image processing information, an image is handled as a RAW still image to which no image processing has been applied.

Furthermore, although the present embodiment has been described using an example in which flags indicating whether the respective types of image processing have been performed are recorded, it is possible to record image processing parameter information indicating to what extent each type of image processing has been performed.

In step S410, the control unit 101 determines whether the white balance processing has been performed from the image processing information acquired in step S405, and proceeds to step S420 if it is determined that the white balance processing has been performed.

In step S415, which is processing for the case where the white balance processing has not been executed with respect to the RAW still image, the control unit 101 performs the white balance processing with respect to the RAW still image.

In step S420, the control unit 101 determines whether the noise removal processing has been performed from the image processing information acquired in step S405, and proceeds to step S430 if it is determined that the noise removal processing has been performed.

In step S425, which is processing for the case where the noise removal processing has not been executed with respect to the RAW still image being handled, the control unit 101 performs the noise removal processing with respect to the RAW still image.

In step S430, the control unit 101 performs RAW development processing other than white balance and noise removal. Note that although detailed descriptions of the RAW development processing will be omitted as the RAW development processing is known, the RAW development processing includes processing of, for example, demosaicing, chromatic aberration correction, color space conversion, color/luminance correction, sharpness, and the like. Also note that in the RAW development processing, the user may be able to set RAW development parameters.

In step S435, the control unit 101 performs processing for displaying the result(s) of the development processing in step S403 or S430 on the preview area 304 of FIG. 3. In the case where continuous shooting images have been handled, as there are a plurality of development results, it will be assumed that this case adopts a configuration in which the user selects an image to be displayed from among the plurality of development results. It goes without saying that other configurations may be adopted in which the development results of continuous shooting images are displayed. Furthermore, together with the image(s) of the RAW development result(s), display items (information displayed in the form of icons and character strings) indicating whether the white balance processing and the noise removal processing have been performed with respect to RAW data may be displayed based on the image processing information.

In step S440, the control unit 101 determines whether the open button 301 or the end button 303 of FIG. 3 has been pressed; if one of the buttons has been pressed, the processing proceeds to step S445, and if neither of the buttons has been pressed, the processing returns to step S435 and the development result(s) is continuously displayed.

In step S445, which is the case of ending the development processing for the target RAW still image(s), the control unit 101 performs processing for clearing the image(s) displayed on the preview area 304 of FIG. 3.

As described above, due to the processing of FIG. 4, appropriate development processing can be performed with respect to RAW still image data that have different properties from normal RAW still images.

Note that when a plurality of pieces of RAW data contained in the RAW still image file are RAW data obtained through continuous shooting, the development processing other than the predetermined image processing (WB, NR) may be executed, and when these pieces of RAW data are not RAW data obtained through continuous shooting, it is possible to switch between the execution of the development processing other than the predetermined image processing and the execution of the development processing including the predetermined image processing depending on the image processing information or whether the image processing information exists.

Furthermore, when the RAW still image file contains a plurality of pieces of RAW data, the development processing other than the predetermined image processing may be executed, and when the RAW still image file has only one piece of RAW data recorded therein, it is possible to switch between the execution of the development processing other than the predetermined image processing and the execution of the development processing including the predetermined image processing depending on the image processing information or whether the image processing information exists.

<RAW Moving Image Processing>

Figure 5:
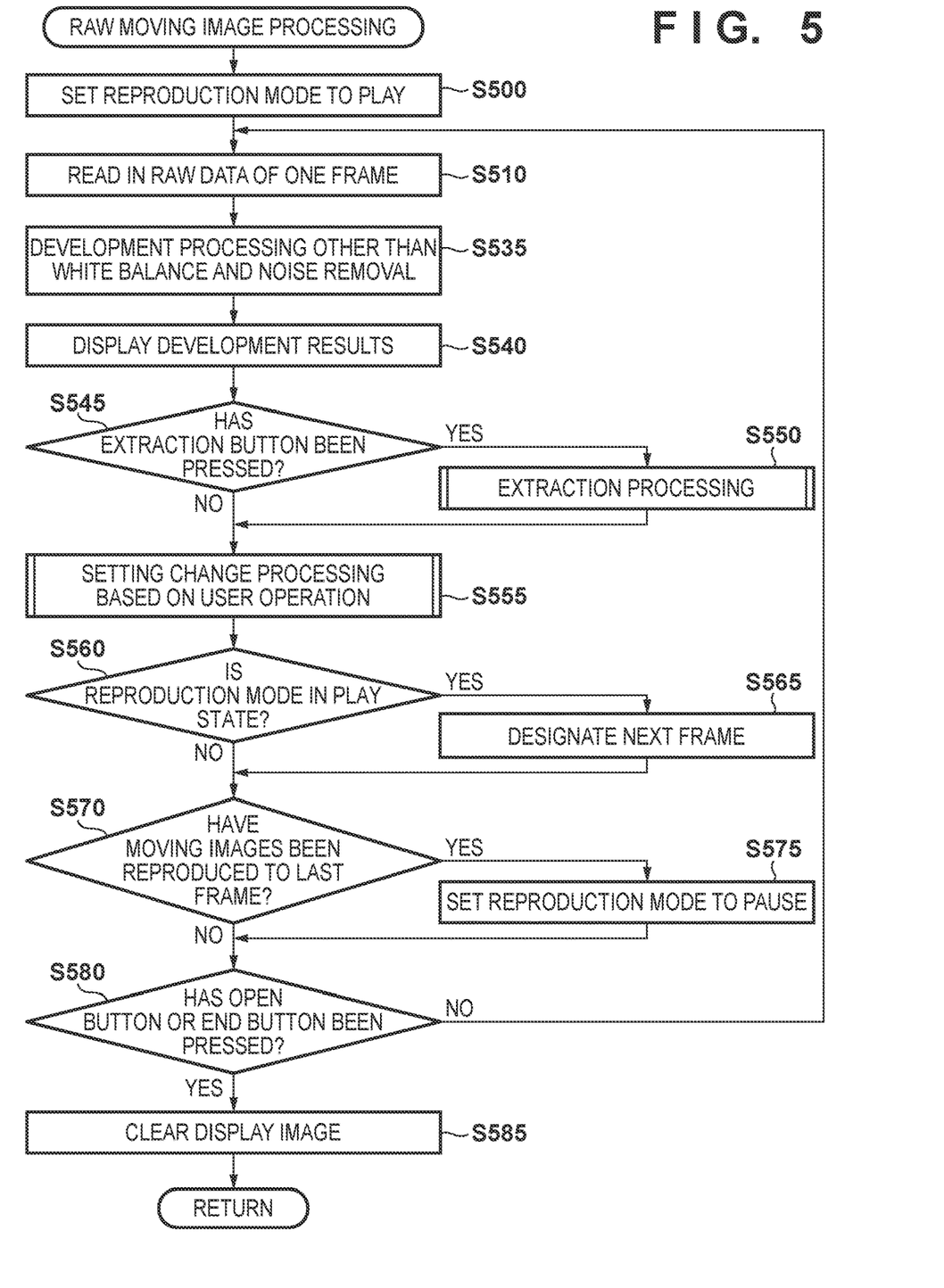
FIG. 5 is a flowchart showing RAW moving image processing of FIG. 2.

Next, the detailed explanations of the RAW moving image processing in step S220 of FIG. 2 will be described using FIG. 5.

In step S500, the control unit 101 sets "play" as a reproduction mode for moving images. The reproduction mode is a mode representing the state of moving image reproduction, and comes in two types: "play" and "pause".

In step S510, the control unit 101 reads in RAW data corresponding to one frame to be displayed. In the case of RAW moving images, unlike RAW still images, data is read in on a per-frame basis instead of reading in all pieces of data in the file at a time. At the start of the reproduction, data of the first frame is read in.

In step S535, the control unit 101 performs RAW development processing other than white balance and noise removal. Note that as the RAW development processing is known, detailed descriptions thereof will be omitted. Also note that in the RAW development processing, the user may be able to set RAW development parameters.

In step S540, the control unit 101 performs processing for displaying the result of the development processing in step S535 on the preview area 304 of FIG. 3.

In step S545, the control unit 101 determines whether the extraction button 302 of FIG. 3 has been pressed; the processing proceeds to step S550 if the extraction button 302 has been pressed, and proceeds to step S555 if the extraction button 302 has not been pressed. The user can extract and record a frame that is currently displayed by operating the extraction button 302. In the present embodiment, data of one extracted frame of RAW moving images is recorded as a still image RAW file.

In step S550, which is processing for generating/storing a RAW still image by extracting (cutting out) one frame of the RAW moving images, the control unit 101 performs processing for storing frame data obtained by extracting a displayed frame as a RAW still image. The detailed explanations of step S550 will be described later.

In step S555, the control unit 101 performs setting change processing based on a user operation. The detailed explanations of step S555 will be described later.

In step S560, the control unit 101 performs branching processing dependent on the reproduction mode. The processing proceeds to step S565 if the reproduction mode is "play", and proceeds to step S570 if the reproduction mode is not "play" but "pause".

In step S565, the control unit 101 designates the next frame as a frame to be displayed. By thus sequentially designating a frame to be displayed from among frames of the moving images, the frames can be reproduced as the moving images.

In step S570, the control unit 101 determines whether the moving images have been reproduced to the end; the processing proceeds to step S575 if the moving images have been reproduced to the end, and proceeds to step S580 if the moving images have not been reproduced to the end.

In step S575, the control unit 101 sets "pause" as the reproduction mode for the moving images. Accordingly, reproducing the moving images to the end will automatically lead to a pause state.

In step S580, the control unit 101 determines whether the open button 301 or the end button 303 of FIG. 3 has been pressed; if one of the buttons has been pressed, the processing proceeds to step S585, and if neither of the buttons has been pressed, the processing returns to step S510 and the reproduction processing of the moving images is continued.

In step S585, which is processing for the case of ending the reproduction processing of the target RAW moving images, the control unit 101 performs processing for clearing the image that was displayed on the preview area 304 of FIG. 3.

<Extraction Processing>

Figure 6:
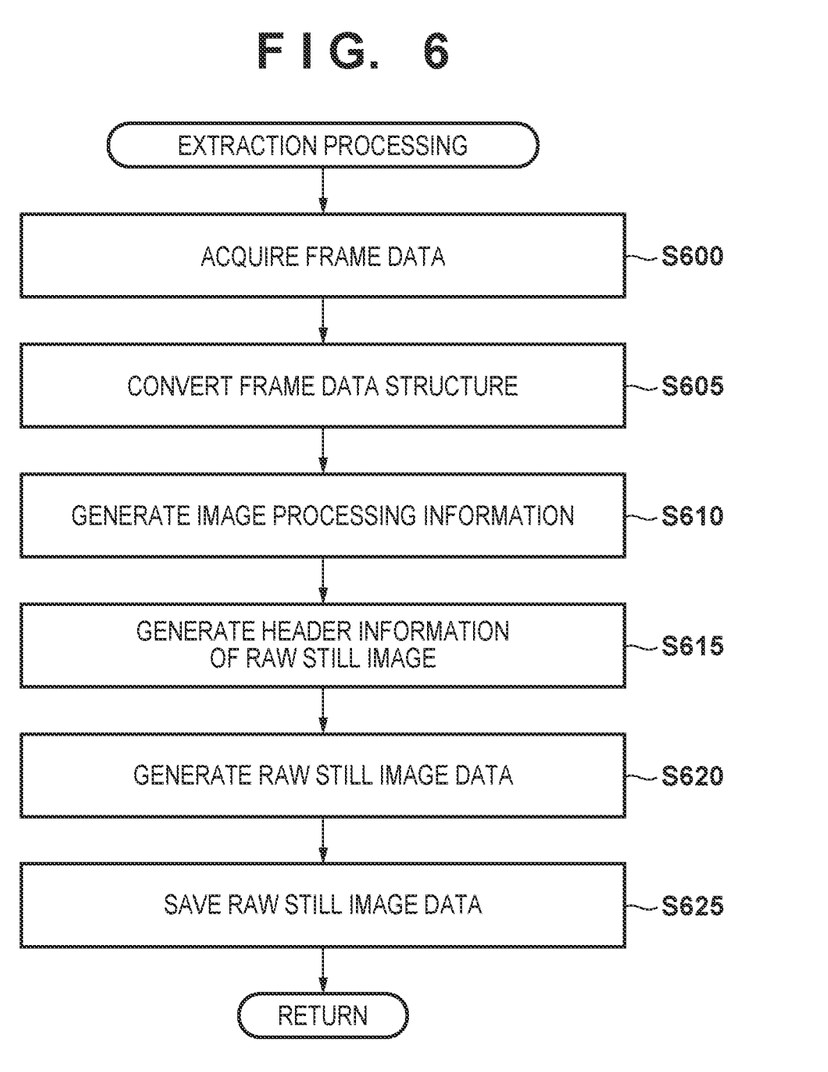
FIG. 6 is a flowchart showing extraction processing of FIG. 5.

Next, the detailed explanations of the extraction (cut out) processing in step S550 of FIG. 5 will be described using FIG. 6.

In step S600, the control unit 101 acquires data corresponding to one frame of a RAW moving image. The data acquired here is the RAW data corresponding to one frame that was read in in step S510.

In step S605, the control unit 101 performs processing for converting the structure of the frame data of the RAW moving image into the same structure as a RAW still image. In the present embodiment, processing for making uniform the number of bits for the color depth is performed. In the present embodiment, as the color depth of the RAW moving image is 12 bits and the color depth of the RAW still image is 14 bits, a conversion from 12 bits into 14 bits is performed with respect to the RAW data corresponding to one frame of the RAW moving image acquired in step S600. Here, the conversion from 12 bits into 14 bits is performed simply by a bit shift.

Although the present embodiment has been described using an example of the number of bits for the color depth, the present embodiment is also applicable to a case where other structures are made uniform. For example, the structure of at least one of the following (a), (b), (c) may be converted.

(a) A pixel arrangement of image data
(b) A color space of image data and information related to the same
(c) A method of recording a plurality of pieces of image data (a) is conversion processing for making a pixel arrangement uniform. For example, when pixels of the frame data of the RAW moving image are recorded in the arrangement order of RGGB and pixels of the RAW still image are recorded in the arrangement order of GBRG, this processing rearranges the arrangement order of the frame data of the RAW moving image from RGGB to GBRG in conformity with the RAW still images. Such a structural difference arises due to, for example, a difference in a pixel arrangement of an image sensor, a difference in processing at the time of recording, and the like.

(b) is conversion processing for making a color space and the like uniform. For example, when the RAW moving image is recorded in a YUV format rather than in an RGB format, this processing makes the structure uniform by performing a conversion from the YUV format into the RGB format.

(c) is conversion processing for making uniform a method of recording a plurality of pieces of image data. For example, when a three-dimensional image has two pieces of RAW data corresponding to right and left, data of "a right image" and "a left image" is recorded as the frame data of the RAW moving image, and data of "the right image+the left image" and "a difference between the right image and the left image" is recorded as the RAW still image, this processing brings the frame data of the RAW moving image into conformity with a method of recording the RAW still image.

Note that the present embodiment is not limited to the above-described examples, and may adopt any configuration that can convert the structure of the frame data of the RAW moving image into the same structure as the RAW still image.

Returning to FIG. 6, in step S610, the control unit 101 generates image processing information according to the features of the RAW moving image. As both of the white balance (WB) processing and the noise removal (NR) processing have been applied to RAW moving images of the present embodiment, the image processing information is generated accordingly as follows.

<Image Processing Information>
Processing ID=00, processed flag=01
Processing ID=01, processed flag=01

In step S615, which is processing for generating header information of a RAW still image, the control unit 101 generates header information of the RAW still image using information of the frame data, and reflects, in the header information, the image processing information of the RAW moving image generated in step S610.

In step S620, which is processing for generating the RAW still image, the control unit 101 generates RAW still image data based on the RAW data whose data structure was converted in step S605 and the header information generated in step S615.

Note that there are cases where information of image processing parameters is recorded in RAW moving image data and the reversion to a state prior to the execution of image processing can be carried out based on such parameters. In these cases, RAW still image data that is similar to that of a state where target image processing has not been executed may be generated by carrying out the reversion to the state prior to processing (executing reverse conversion processing) and setting the processed flag of the image processing information to 00.

In step S625, the control unit 101 performs processing for placing the RAW still image data generated in step S620 into a file and storing the file. In the present embodiment, the file is stored under a file name composed of a file name of the original moving images followed by a frame number. The file name may be designated by the user.

Through the above-described extraction processing, the frame data of the RAW moving image can be stored after converting its structure into the same structure as the RAW still image, and furthermore, the image processing information of the RAW moving image can be appropriately set.

<Setting Change Processing Based on User Operation>

Figure 7:
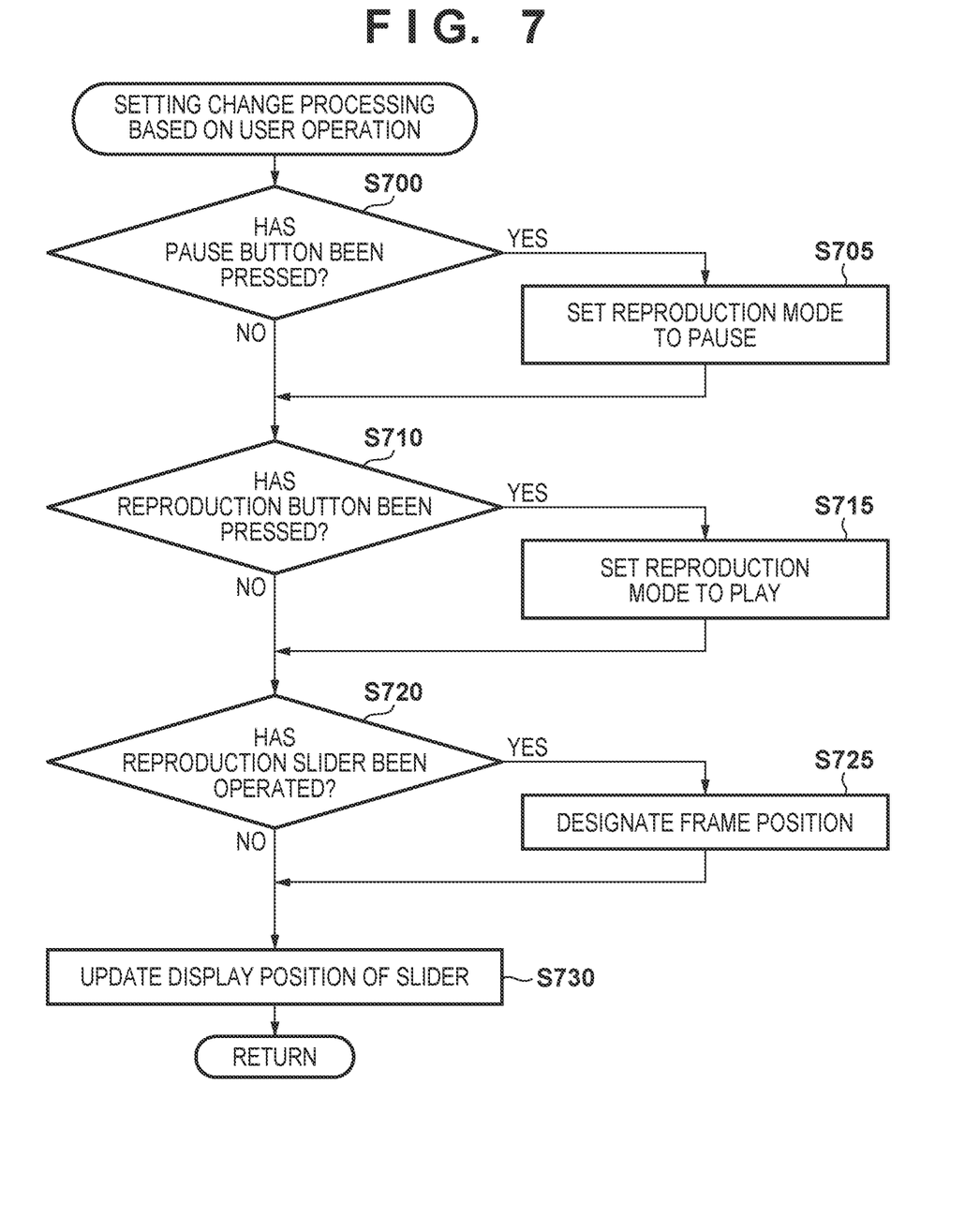
FIG. 7 is a flowchart showing setting change processing based on a user operation of FIG. 5.

Next, the detailed explanations of the setting change processing based on the user operation in step S555 of FIG. 5 will be described using FIG. 7.

In step S700, the control unit 101 determines whether the pause button 306 of FIG. 3 has been pressed; the processing proceeds to step S705 if the pause button 306 has been pressed, and proceeds to step S710 if the pause button 306 has not been pressed.

In step S705, which is processing for the case where the pause button 306 has been pressed, the control unit 101 sets "pause" as the reproduction mode.

In step S710, the control unit 101 determines whether the reproduction button 305 of FIG. 3 has been pressed; the processing proceeds to step S715 if the reproduction button 305 has been pressed, and proceeds to step S720 if the reproduction button 305 has not been pressed.

In step S715, which is processing for the case where the reproduction button 305 has been pressed, the control unit 101 sets "play" as the reproduction mode.

In step S720, the control unit 101 determines whether the reproduction slider 307 of FIG. 3 has been operated; the processing proceeds to step S725 if the reproduction slider 307 has been operated, and proceeds to step S730 if the reproduction slider 307 has not been operated.

In step S725, which is processing for the case where the reproduction slider 307 has been operated, the control unit 101 performs processing for designating a frame to be displayed in accordance with the position of the reproduction slider 307. Note that when the reproduction slider 307 is at the leftmost position, the designated frame corresponds to the first frame of the moving images, and when the reproduction slider 307 is at the rightmost position, the designated frame corresponds to the last frame of the moving images.

In step S730, the control unit 101 performs processing for updating the display position of the reproduction slider 307 of FIG. 3. This is processing for displaying an indicator in correspondence with the frame that is currently designated as a frame to be displayed from among the moving images.

By repeating steps S510 to S580 in the above-described manner, operations of reproducing the RAW moving images, designating the display position, and the like can be performed. Furthermore, the displayed frame can be stored as a RAW still image.

As described above, according to the present embodiment, frame data of one frame extracted from RAW moving images can be stored after converting its structure into the same structure as a RAW still image. Furthermore, appropriate development processing can be performed with respect to a RAW still image extracted from RAW moving images even when the extracted RAW still image has different properties from a normal RAW still image.

Note that although the present embodiment has been described using an example in which frames are extracted one-by-one from a RAW moving image file, a plurality of frames may be extracted at a time rather than extracting one frame at a time. Furthermore, in the above description, a part of frames is extracted from a RAW moving image file and recorded as a RAW still image file. However, it is possible to adopt a configuration in which a user selection can switch between recording of the part of the frames extracted from the RAW moving image file as a RAW still image file and recording of the same as a RAW moving image file. Alternatively, when a RAW image corresponding to one frame is extracted from a RAW moving image file, the RAW image may be recorded as a RAW still image file, whereas when RAW images corresponding to a plurality of frames are extracted, the RAW images may be recorded as a RAW moving image file. In this case, when one frame extracted from the RAW moving image file is recorded as the RAW still image file, the image processing information (processed flag) is recorded as described earlier. On the other hand, when a part of the frames extracted from the RAW moving image file is recorded as a new RAW moving image file, the image processing information (processed flag) is not recorded. This is because recording the same as the RAW moving image file makes it possible to identify the executed state of the predetermined image processing (WB, NR).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142561, filed Jul. 30, 2018, which is hereby incorporated by reference herein in its entirety.

What is claimed is:

1. An image processing apparatus comprising:
   a memory and at least one processor which function as a
      recording control unit configured to perform control to,
         when extracting a frame from a RAW file in which
         RAW data of a plurality of frames is recorded and recording the extracted frame as a RAW still image file, record RAW data of the extracted frame and information indicating that predetermined image processing has been applied to the RAW data into the RAW still image file, wherein when extracting one frame from a RAW moving image file in which RAW data of a plurality of frames is recorded and recording the extracted one frame as a RAW still image file, the recording control unit performs control to record information indicating that predetermined image processing has been applied to the RAW data into the RAW still image file, and wherein when extracting a frame from a RAW moving image file in which RAW data of a plurality of frames is recorded and recording the extracted frame as a new RAW moving image file, the recording control unit performs control so as not to record information indicating that predetermined image processing has been applied to the RAW data into the new RAW moving image file.

2. The apparatus according to claim 1, wherein the predetermined image processing has been applied, at a time of shooting, to the RAW data recorded in the RAW moving image file.

3. The apparatus according to claim 1, wherein the memory and the at least one processor further function as:
   (a) a processing unit configured to apply development processing to RAW data recorded in a RAW still image file; and
   (b) a display control unit configured to perform control to display the RAW data to which the development processing has been applied by the processing unit on a display unit, and
   wherein when information indicating that the predetermined image processing has been applied is recorded in the RAW still image file, the processing unit executes the development processing other than the predetermined image processing.

4. The apparatus according to claim 3, wherein when a plurality of pieces of RAW data contained in the RAW still image file are RAW data obtained through continuous shooting, the processing unit executes the development processing other than the predetermined image processing, and
   wherein when the plurality of pieces of RAW data contained in the RAW still image file are not the RAW data obtained through the continuous shooting, the processing unit switches between an execution of the development processing other than the predetermined image processing and an execution of the development processing including the predetermined image processing depending on the information indicating that the predetermined image processing has been applied or whether the information exists.

5. The apparatus according to claim 3, wherein when a plurality of pieces of RAW data are contained in the RAW still image file, the processing unit executes the development processing other than the predetermined image processing, and
   wherein when only one piece of RAW data is recorded in the RAW still image file, the processing unit switches between an execution of the development processing other than the predetermined image processing and an execution of the development processing including the predetermined image processing depending on the information indicating that the predetermined image processing has been applied or whether the information exists.

6. The apparatus according to claim 1, wherein the memory and the at least one processor further function as a display control unit configured to perform control to display an image based on RAW data on a display unit, and
   wherein the display control unit displays, together with the image based on the RAW data, a display item indicating that the predetermined image processing has been applied to the RAW data.

7. An image processing method comprising:
   extracting a frame from a RAW file in which RAW data of a plurality of frames is recorded; and
   recording the extracted frame as a RAW still image file,
   wherein in the recording, control is performed to record RAW data of the extracted frame and information indicating that predetermined image processing has been applied to the RAW data into the RAW still image file,
   wherein when the extracting extracts one frame from a RAW moving image file in which RAW data of a plurality of frames is recorded and the recording records the extracted one frame as a RAW still image file, the recording performs control to record information indicating that predetermined image processing has been applied to the RAW data into the RAW still image file, and
   wherein when the extracting extracts a frame from a RAW moving image file in which RAW data of a plurality of frames is recorded and the recording records the extracted frame as a new RAW moving image file, the recording performs control so as not to record information indicating that predetermined image processing has been applied to the RAW data into the new RAW moving image file.

8. A non-transitory computer-readable storage medium storing a program for causing a computer to execute an image processing method, the method comprising:
   extracting a frame from a RAW file in which RAW data of a plurality of frames is recorded; and
   recording the extracted frame as a RAW still image file,
   wherein in the recording, control is performed to record RAW data of the extracted frame and information indicating that predetermined image processing has been applied to the RAW data into the RAW still image file,
   wherein when the extracting extracts one frame from a RAW moving image file in which RAW data of a plurality of frames is recorded and the recording records the extracted one frame as a RAW still image file, the recording performs control to record information indicating that predetermined image processing has been applied to the RAW data into the RAW still image file, and
   wherein when the extracting extracts a frame from a RAW moving image file in which RAW data of a plurality of frames is recorded and the recording records the extracted frame as a new RAW moving image file, the recording performs control so as not to record information indicating that predetermined image processing has been applied to the RAW data into the new RAW moving image file.

9. An image processing apparatus comprising:
   a memory and at least one processor which function as a plurality of units comprising:
   (1) a recording control unit configured to perform control to, when extracting a frame from a RAW file in which RAW data of a plurality of frames is recorded and recording the extracted frame as a RAW still image file, record RAW data of the extracted frame and information indicating that predetermined image processing has been applied to the RAW data into the RAW still image file;

(2) a processing unit configured to apply development processing to RAW data recorded in a RAW still image file; and (3) a display control unit configured to perform control to display, on a display unit, the RAW data to which the development processing has been applied by the processing unit, wherein when information indicating that the predetermined image processing has been applied is recorded in the RAW still image file, the processing unit executes the development processing other than the predetermined image processing, wherein when a plurality of pieces of RAW data contained in the RAW still image file are RAW data obtained through continuous shooting, the processing unit executes the development processing other than the predetermined image processing, and wherein when the plurality of pieces of RAW data contained in the RAW still image file are not the RAW data obtained through the continuous shooting, the processing unit switches between an execution of the development processing other than the predetermined image processing and an execution of the development processing including the predetermined image processing depending on the information indicating that the predetermined image processing has been applied or whether the information exists.

10. The apparatus according to claim 9, wherein the display control unit displays, together with the image based on the RAW data, a display item indicating that the predetermined image processing has been applied to the RAW data.

11. An image processing method comprising:
extracting a frame from a RAW file in which RAW data of a plurality of frames is recorded; and
recording the extracted frame as a RAW still image file, wherein in the recording, control is performed to record RAW data of the extracted frame and information indicating that predetermined image processing has been applied to the RAW data into the RAW still image file;
applying development processing to RAW data recorded in a RAW still image file; and
performing control to display, on a display unit, the RAW data to which the development processing has been applied,
wherein when information indicating that the predetermined image processing has been applied is recorded in the RAW still image file, the applying development processing executes the development processing other than the predetermined image processing,
wherein when a plurality of pieces of RAW data contained in the RAW still image file are RAW data obtained through continuous shooting, the applying development processing executes the development processing other than the predetermined image processing, and
wherein when the plurality of pieces of RAW data contained in the RAW still image file are not the RAW data obtained through the continuous shooting, the applying development processing switches between an execution of the development processing other than the predetermined image processing and an execution of the development processing including the predetermined image processing depending on the information indicating that the predetermined image processing has been applied or whether the information exists.

12. An image processing apparatus comprising:
a memory and at least one processor which function as a plurality of units comprising:

(1) a recording control unit configured to perform control to, when extracting a frame from a RAW file in which RAW data of a plurality of frames is recorded and recording the extracted frame as a RAW still image file, record RAW data of the extracted frame and information indicating that predetermined image processing has been applied to the RAW data into the RAW still image file;

(2) a processing unit configured to apply development processing to RAW data recorded in a RAW still image file; and (3) a display control unit configured to perform control to display the RAW data to which the development processing has been applied by the processing unit on a display unit, wherein when information indicating that the predetermined image processing has been applied is recorded in the RAW still image file, the processing unit executes the development processing other than the predetermined image processing, wherein when a plurality of pieces of RAW data are contained in the RAW still image file, the processing unit executes the development processing other than the predetermined image processing, and wherein when only one piece of RAW data is recorded in the RAW still image file, the processing unit switches between an execution of the development processing other than the predetermined image processing and an execution of the development processing including the predetermined image processing depending on the information indicating that the predetermined image processing has been applied or whether the information exists.

13. The apparatus according to claim 12, wherein the display control unit displays, together with the image based on the RAW data, a display item indicating that the predetermined image processing has been applied to the RAW data.

14. An image processing method comprising:
extracting a frame from a RAW file in which RAW data of a plurality of frames is recorded; and
recording the extracted frame as a RAW still image file, wherein in the recording, control is performed to record RAW data of the extracted frame and information indicating that predetermined image processing has been applied to the RAW data into the RAW still image file;
applying development processing to RAW data recorded in a RAW still image file; and
performing control to display, on a display unit, the RAW data to which the development processing has been applied,
wherein when information indicating that the predetermined image processing has been applied is recorded in the RAW still image file, the applying development processing executes the development processing other than the predetermined image processing,
wherein when a plurality of pieces of RAW data are contained in the RAW still image file, the applying development processing executes the development processing other than the predetermined image processing, and wherein when only one piece of RAW data is recorded in the RAW still image file, the applying development processing switches between an execution of the development processing other than the predetermined image processing and an execution of the development processing including the predetermined image processing depending on the information indicating that the predetermined image processing has been applied or whether the information exists.

* * * * *